(12) United States Patent
Colling

(10) Patent No.: US 8,734,104 B2
(45) Date of Patent: May 27, 2014

(54) CONTROL DEVICE AND METHOD FOR AN AERODYNAMIC BRAKE OF A WIND ENERGY CONVERTER

(76) Inventor: Claus Colling, Gammelsdorf (DE)

(*) Notice: Subject to any disclaimer, the term of this patent is extended or adjusted under 35 U.S.C. 154(b) by 971 days.

(21) Appl. No.: 12/865,278

(22) PCT Filed: Jan. 22, 2009

(86) PCT No.: PCT/EP2009/000385
§ 371 (c)(1),
(2), (4) Date: Jul. 29, 2010

(87) PCT Pub. No.: WO2009/095181
PCT Pub. Date: Aug. 6, 2009

(65) Prior Publication Data
US 2011/0002772 A1    Jan. 6, 2011

(30) Foreign Application Priority Data
Jan. 29, 2008 (EP) .................................. 08001625

(51) Int. Cl.
*F03D 7/06* (2006.01)

(52) U.S. Cl.
USPC .................................. 416/1; 416/23; 416/53

(58) Field of Classification Search
USPC ................... 416/23, 51–53, 139, 146 R, 123; 290/44, 55
See application file for complete search history.

(56) References Cited

U.S. PATENT DOCUMENTS

| 2,480,687 | A | | 8/1949 | Albers et al. | |
|---|---|---|---|---|---|
| 4,111,601 | A | * | 9/1978 | Richard | 416/41 |
| 4,355,955 | A | * | 10/1982 | Kisovec | 416/23 |
| 4,565,929 | A | | 1/1986 | Baskin et al. | |
| 4,692,095 | A | * | 9/1987 | Lawson-Tancred | 416/23 |
| 5,269,652 | A | | 12/1993 | Petersen | |
| 5,375,324 | A | * | 12/1994 | Wallace et al. | 29/889.21 |
| 5,456,579 | A | | 10/1995 | Olson | |
| 5,487,645 | A | * | 1/1996 | Eccles | 416/51 |
| 7,217,091 | B2 | * | 5/2007 | LeMieux | 416/95 |
| 2008/0227378 | A1 | * | 9/2008 | Yokoi | 452/64 |

FOREIGN PATENT DOCUMENTS

| FR | 1006698 | 4/1952 |
|---|---|---|
| GB | 193827 | 3/1924 |
| GB | 2227286 | 7/1990 |

\* cited by examiner

*Primary Examiner* — Nathan Wiehe
*Assistant Examiner* — Woody A Lee, Jr.
(74) *Attorney, Agent, or Firm* — K&L Gates LLP

(57) ABSTRACT

A wear-free, self-contained control device for an aerodynamic emergency brake of a wind energy converter is presented that comprises multiple components in order to provide a most effective means to control the rotation of a vertical axis wind turbine by a brake, which is able to activate itself without external actuation in malfunction situations and is able to shut down the vertical axis wind turbine. Therefore, a mass element is utilized to store mechanical energy which in turn is used to deploy an aerodynamic braking operation. It also represents a means to control and limit the amount of torque, as absorbed by the turbine in high-wind conditions, and thus provides the ability to harvest electrical/mechanical energy, beyond the normal operational wind speeds of turbines.

29 Claims, 9 Drawing Sheets

CONTROL DEVICE AND METHOD FOR AN AERODYNAMIC BRAKE OF A WIND ENERGY CONVERTER

BACKGROUND OF THE INVENTION

The present invention relates to a torque-limiting control device, plus an aerodynamic brake in particular for the application in vertical axis wind turbines and a means for thermally deicing vertical axis wind turbine air foils.

In the course of the rapidly growing onward development of the usage of wind energy, it is a common desire to design wind energy plants and wind energy systems respectively, in a more efficient way. However, the control of wind energy plants under strong wind conditions is a noted problem, regardless if they are designed as vertical axis wind turbine 14 (VAWT) or horizontal axis wind turbine (HAWT). Known vertical axis wind turbines are e.g. Savonius wind turbines or Darrieus wind turbines (mostly giromill wind turbines). It has to be noted that rotors for vertical axis wind turbines are not to be understood in the sense of a propeller, but rather as wing-like driving airfoils and vertical airfoil runners respectively, or resistance runners, i.e. anemometers, which are purely driven by their drag. Vertical airfoil runners follow the active principle of the generation of ascending force like an aircraft wing—yet the ascending component does not act against the gravity (like at an aircraft), but, as it is known to a person skilled in the art, 90° horizontally to the gravity vector, thus transforming lift into torque in order to propel the turbine.

Mainly at high wind speeds the rotation speed of the rotor has to be limited to prevent damage or destruction of the wind energy systems caused by exceeding wind energy. Furthermore, there has to be a possibility to shut down wind energy systems for maintenance work and repair work, even if wind energy drives the wind energy systems at the same time. Thus, it is important that each wind energy system comprises a brake device. However, conventional brakes such as wheel disk brakes or drum brakes are not adequate since they are subjected to high wear. Furthermore, a permanent brake capacity has to be ensured. Friction-based brakes may heat up themselves until brake failure occurs. This problem may be solved in the prior art by the use of wear-free eddy current brakes. However, a problem results in that eddy current brakes may not permit individual control and they are ineffective at power failure or control failure. Systems according to prior art having adjustable rotor-blades may not be turned away from the wind any more at power failure or control failure so that the wind energy may still continue to drive the rotor to self-destruction. Thus, there is a need for wind energy plants having a self-governed automatic brake activation and automatic shut down respectively, in case of malfunction situations. In the prior art, an additional problem results if an emergency situation occurs, e.g. a lightning strike, and the electric control devices fail so that a shut down of the wind-turbine (HAWT and/or VAWT) becomes impossible.

SUMMARY

The object of the present invention is to provide a most beneficial possibility as possible to control the rotation of a vertical axis wind turbine 14 in a wear-free manner by a brake, which activates itself in a malfunction situation without external control and which is able to bring the vertical axis wind turbine 14 to a halt. This problem is solved according to the invention by the control device 1 for an aerodynamical brake according to the appending claims, in particular by claim 1.

According to an aspect of the invention, a control device 1 for an aerodynamic brake is provided having at least one airfoil segment and vertical airfoil blade segment, respectively, comprising: a spring component assembly having a torsion element 3. wherein the torsion element 3 can additionally be provided with a spring element for preloading the aerodynamic brake in a retracted position; a mass component assembly 4 having at least one mass element 5 for extending the aerodynamic brake by centrifugal force caused by a sufficiently high rotation, and against an preload of the spring element; an actuator component assembly 7 having an actuator 8, which is coupled to the aerodynamic brake and which may be actuated to extend the aerodynamic brake, also against a preload of the spring element if existent. The torsion element enables torsion of the mass component assembly 4 and the actuator component assembly 7. The aerodynamic brake, according to an embodiment of the present invention, is able to control the torque characteristics of a vertical axis wind turbine 14.

According to another aspect of the invention, an airfoil segment for a vertical axis wind turbine is provided comprising at least one control device for an aerodynamic brake of a vertical axis wind turbine in at least one airfoil segment of a vertical axis wind turbine, comprising: a torsion element 3, which may comprise a spring element to preload the aerodynamic brake in direction of the retracted position, at least one mass element to extend the aerodynamic brake by centrifugal force caused by a sufficiently high rotation of the airfoil segment, even against the preload of the spring element, a lever arm, connected with an actuator, wherein said lever arm is actuated by said actuator to extend the aerodynamic brake.

According to another aspect of the invention, a wind energy system is provided, comprising at least one rotor having at least one airfoil segment for a vertical axis wind turbine comprising at least one control device for an aerodynamic brake of a vertical axis wind turbine in at least one airfoil segment of a vertical axis wind turbine, comprising: a torsion element 3, which may comprise a spring element to preload the aerodynamic brake in direction of the retracted position, at least one mass element to extend the aerodynamic brake by a centrifugal force caused by a sufficiently high rotation of the airfoil segment against the preload of the spring element, a lever arm, connected with an actuator, wherein said lever arm is actuated by said actuator to extend the aerodynamic brake.

According to another aspect of the invention, a method for an aerodynamic braking operation of a vertical axis wind turbine having a control device is provided.

The present invention additionally has the advantage that it is not only possible with this arrangement to brake a vertical axis wind turbine 14 in a wear-free manner but also to control its rotational speed in a wear-free manner while there is excess wind. As a result, the present invention also allows an operation of a vertical axis wind turbine 14 during high wind speeds and rapidly changing wind conditions (wind direction, squalls, etc.), at which conventional vertical axis wind turbine 14 have to be shut down to prevent them from being damaged.

DETAILED DESCRIPTION

In FIGS. 1, 2, 3 and 4, respectively, there are directions defined in space having three axis directions: x, y and z, for the sake of better intelligibility of the three-dimensional illustration. It has to be noted that the directions are maintained throughout all figures. The x-direction extends from the end of the profile 17 towards the leading edge 16. The y-direction extends radially outwards with respect to the rotation axis of the vertical axis wind turbine 14 (VAWT). The z-direction extends alongside bottom-up of the length of an airfoil segment and vertical axis runner segment 6 of a VAWT, i.e. from the basis of the VAWT perpendicularly to the top of the VAWT. It represents an axis being orientated in parallel to the vertical, rotational axis of the VAWT.

Figure 2:
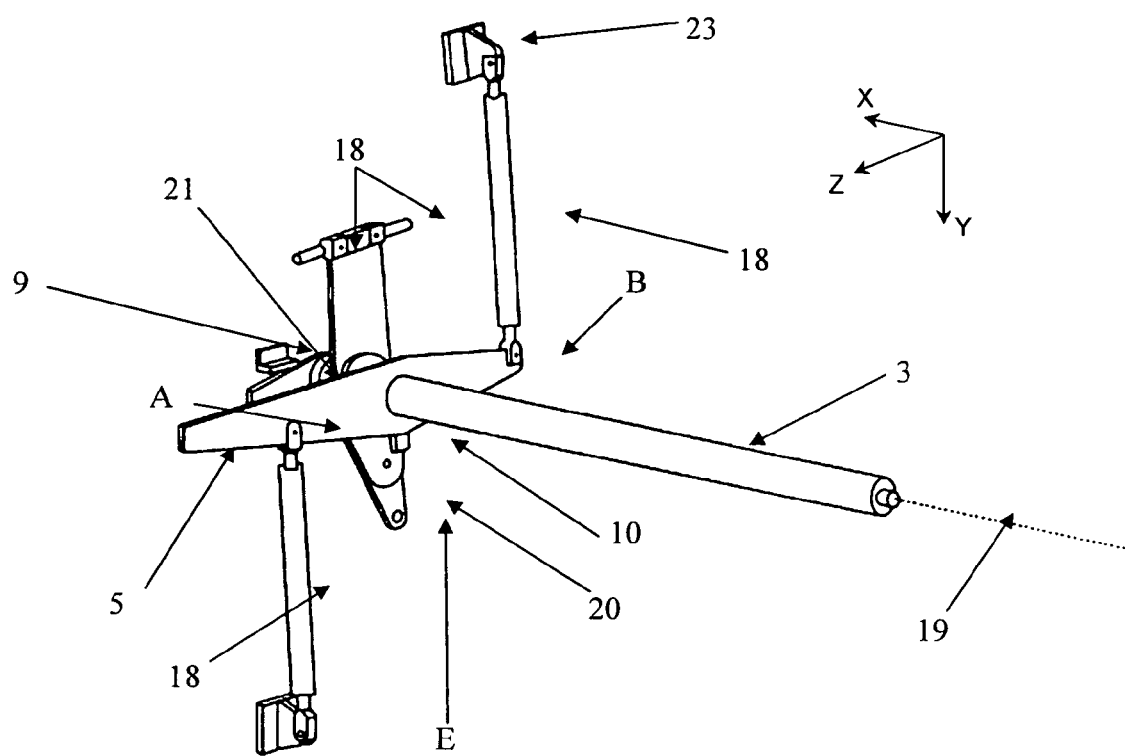
FIG. 2 shows an embodiment of the control device 1 according to the present invention with connection elements 18.

The control device 1 according to an embodiment of the present invention comprises three components: The spring component assembly (not shown) comprises at least one torsion element 3, which may comprise a spring element for preloading the aerodynamic brake towards a retracted position. Thus, this spring element may exert a preload force to the aerodynamic brake. The torsion element enables torsion of the mass component assembly 4 and the actuator component assembly 7. The retracted position corresponds to a non-activation of the aerodynamic brake. The spring element is designed as tension spring arrangement, but may as well be comprised in a torsion element (e.g. torsion element 3), as shown in FIG. 2. In an embodiment of the present invention (FIG. 2), this torsion element 3 is placed in the airfoil segment 6 such that its rotational axis and torsion axis, respectively, extends from the leading edge 16 to the trailing edge 17 of the airfoil segment 6, but may also be assembled in another way according to the invention and depends on the respective requirements, e.g. available space or already predetermined inner constructions. The preload may keep the aerodynamic brake in a retracted position in which no brake effect is caused. However, also other kinds of spring elements may be used, e.g. gas-filled springs, hydraulic springs, coach springs or torsional springs, and have to be chosen depending on the requirements directed to the vertical axis wind turbine 14.

Figure 1:
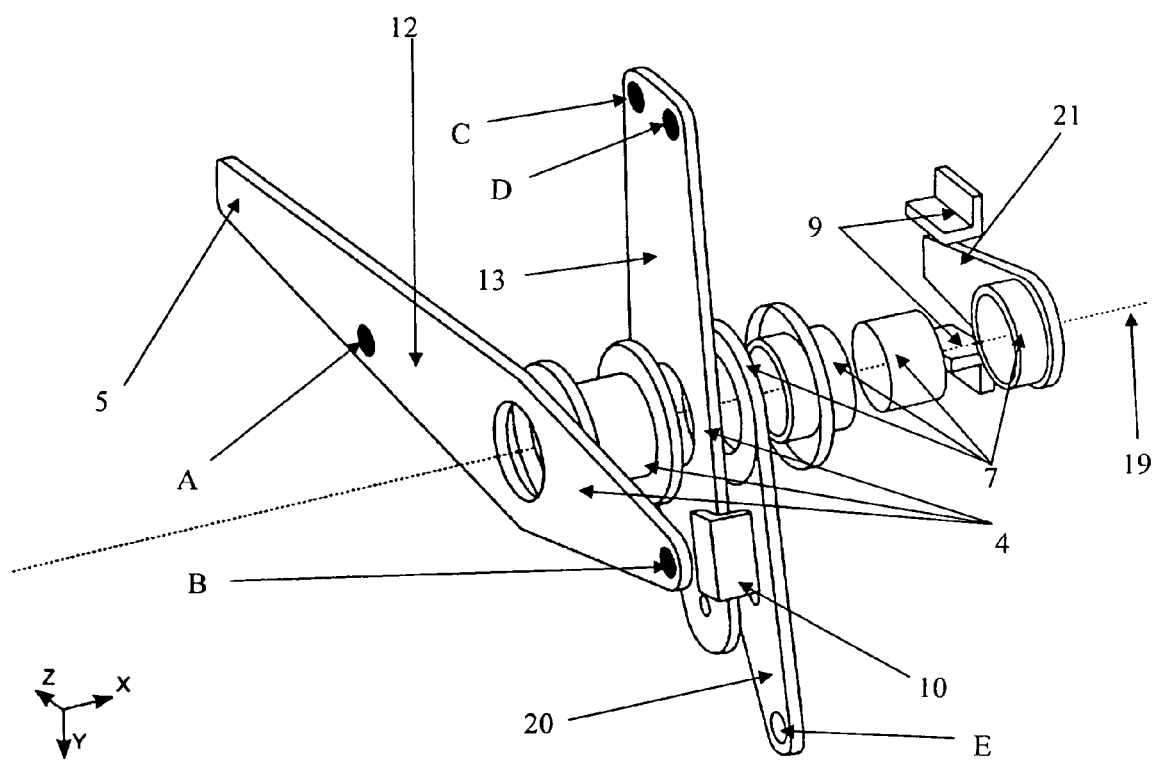
FIG. 1 shows an embodiment of the control device according to the present invention in an exploded view without torsion element 3.
Figure 1A:
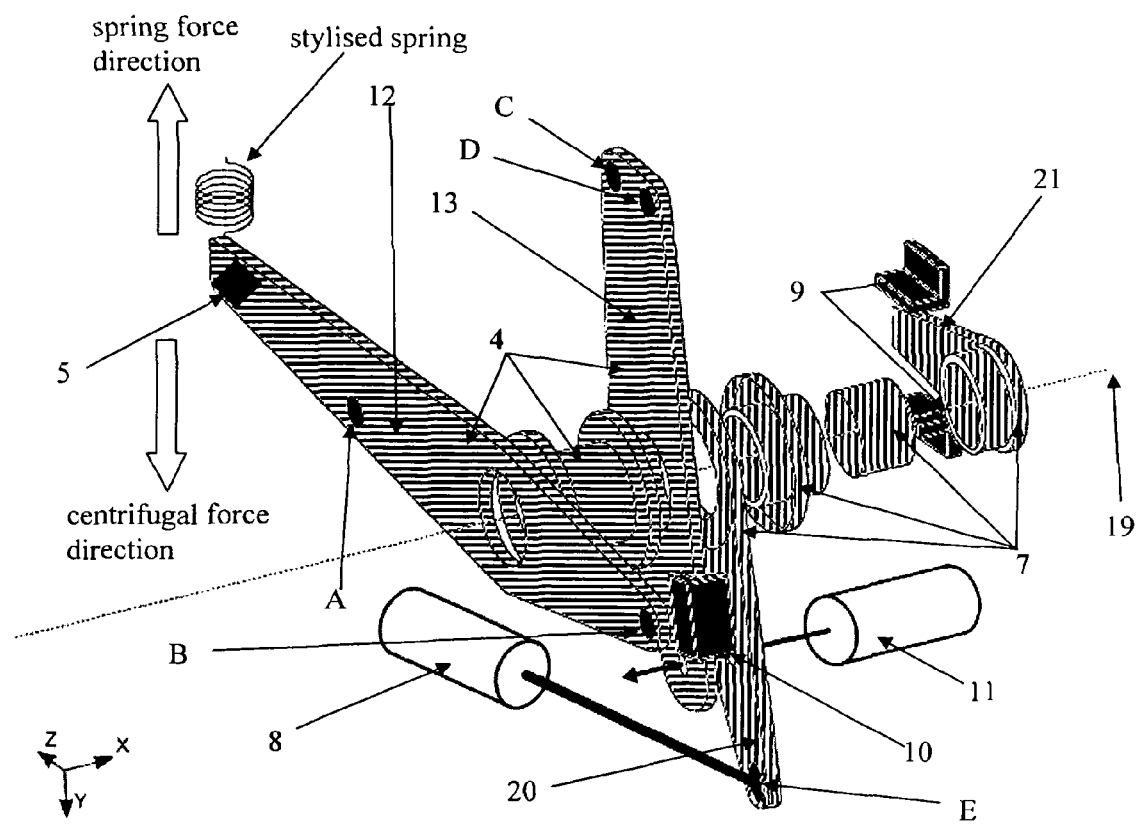
FIG. 1a shows an embodiment of the control device of FIG. 1 according to the present invention in an exploded view without torsion element 3.

In FIG. 1 individual parts of the second 4 and third 7 component of an embodiment of the invention are shown. The arrows with respect to the reference signs 4 and 7 just indicate the belonging of the parts to individual components and the individual parts are thus additionally provided with part-corresponding reference numbers. The mass component assembly 4 comprises at least one mass element 5 for extending the aerodynamic brake by centrifugal force caused by a sufficiently high rotation of the airfoil segment 6, even against the preload of the spring element if existent, as is shown in FIG. 1a. In an embodiment the mass element 5 is positioned such that the centrifugal force generates a radial movement of the mass element 5 with respect to the rotation axis of the vertical axis wind turbine 14, i.e. in y-direction and thus substantially perpendicular to the longitudinal axis of the airfoil segment and vertical axis runner segment, which applies a force by an inertia arm 12, such as a lever device, in order to extend the aerodynamic brake.

FIG. 1a shows an embodiment of the present invention wherein the coupling device 11 provides synchronisation between both assemblies to enable the coupling process. Additionally, FIG. 1a shows the directions of the spring force and the centrifugal force affecting the mass component assembly. Further the spring-tension and spring element, respectively, is indicated by a small stylised spring. This spring effect can be achieved by the stylized coil-spring element or by any other spring like a torsional spring, housed in the torsion element 3, or the like. For better intelligibility, the mass component assembly is drawn in horizontal stripes while the actuator component assembly is drawn in vertical stripes. The limiters 9 and 10, the coupling device 11 and the mass element are indicated in black.

The fully extended position corresponds to an activation of the aerodynamic brake (FIG. 1 and FIG. 2). An embodiment of the invention is also possible not comprising any spring element. Alternatively, the mass component assembly 4 may take over the task of a spring element. In this case the mass element 5 may be positioned such that the weight of the mass element 5 causes preloading of the aerodynamic brake towards a retracted position by using a lever device and/or a gear device for force transfer. The weight of the mass element 5 may be effective as a preload force in the negative z-direction, while the centrifugal force pushes the mass element 5 radially outwards with respect to the rotation axis 15 of the vertical axis wind turbine 14, i.e. in y-direction substantially perpendicular to the longitudinal axis of the airfoil segment.

When the vertical axis wind turbine 14 rotates, the mass element 5 is driven radially outwards by the centrifugal acceleration (y-direction in FIGS. 1, 2, 3 and 4) and thereby extends the aerodynamic brake, which operates against the rotation of the vertical axis wind turbine 14 and thus decelerating same. The movement of the mass element is transferred to the aerodynamic brake by the inventive arrangement of an embodiment, as shown in FIG. 2. FIG. 2 shows an assembled embodiment of the present invention. Here, the connection elements 18, e.g. driving rods or push-pull-rods, are respectively attached at the connection points A and B in a movable manner such that a connection element is moved respectively in y-direction and in negative y-direction during braking action. Of course the present invention is not limited to two driving rods. An arbitrary number of such driving rods may be attached. An embodiment which comprises only one such driving rod is also possible. The aerodynamic brake causes an almost complete disruption of the air flow over the airfoil for the vertical axis wind turbine 14 during a full braking action (100%). This is explained below in more detail.

In an embodiment the mass component assembly 4 comprises an inertia arm 12 having a first and a second end. The inertia arm 12 is fixedly jointed to the torsion element between its first and second ends perpendicular to the rotation axis 19 of the torsion element. According to this preferred embodiment the mass component assembly 4 further comprises an intercoupling arm 13 having a first and a second end, wherein the intercoupling arm 13 is also fixed to the torsion element between its first and second ends perpendicular to the rotation axis 19 of the torsion element in a manner analogue to the inertia arm 12, and perpendicular to the inertia arm (see FIG. 1). The inertia arm 12 and intercoupling arm 13, respectively, may also be joined in other angle ratios in correlation to each other and the angle ratios may be adapted by a person skilled in the art, depending on the needs. A variable adaption of the angle ratios during running operation of the present invention is also possible in an additional embodiment. These sub-components may be e.g. lever devices like bars, pipes or the like.

The spring component assembly is operatively connected to the mass component assembly. This may be a direct connection by welding, brazing or screwing the spring component assembly and the mass component assembly 4 together. However, also intermediate elements 19 may be inserted between the spring component assembly and the mass component assembly in order to make an indirect connection between the spring component assembly and the mass component assembly by one or more intermediate elements 19. These intermediate elements 19 may e.g. be gear devices causing a force redirection. Thus it is possible that in different embodiments of the invention the torsion element and the mass element 5 are able to move in identical rotation direction or in opposite directions. The sub-components do not necessarily have to be symmetrical.

Figure 4:
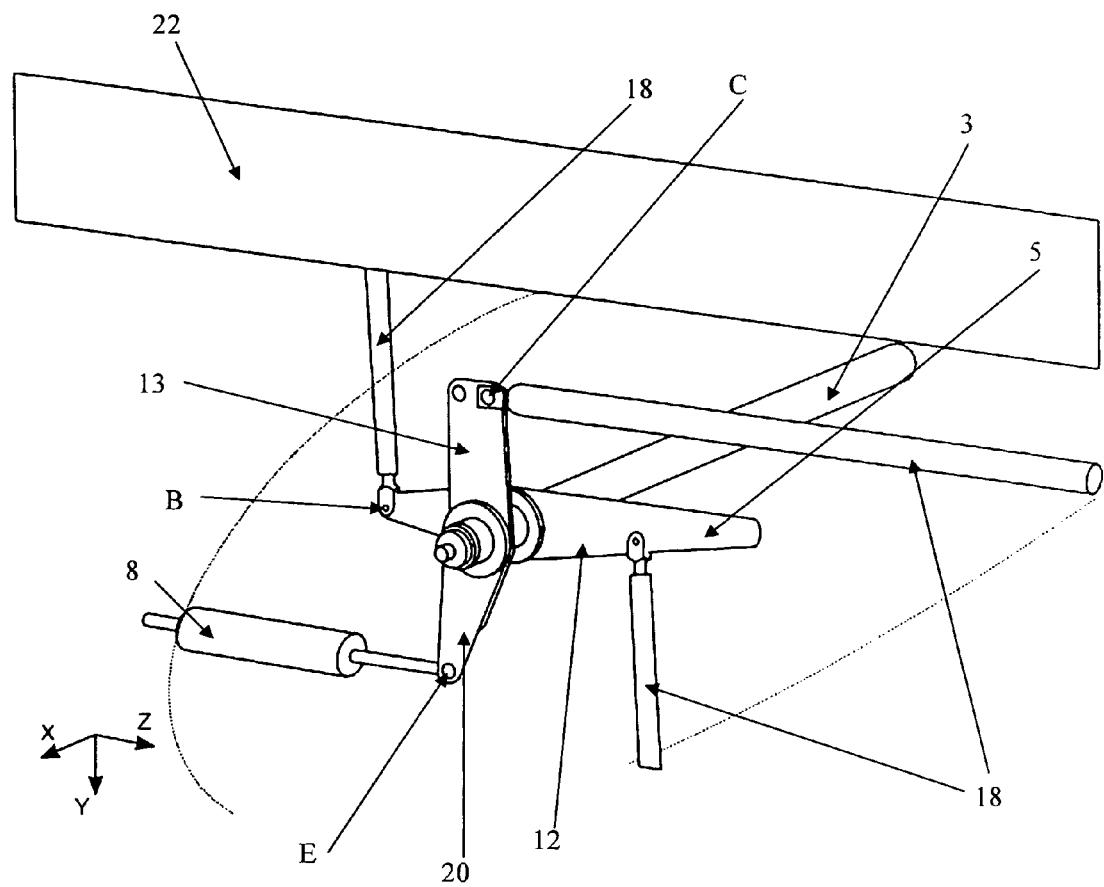
FIG. 4 shows an embodiment of the control device 1 according to the present invention assembled in an airfoil segment 6 and actuated by an actuator 8.

In an embodiment of the invention the mass element 5 is advantageously attached to the first end of the intercoupling arm (FIG. 1 and FIG. 4). However, the mass element 5 may also be provided by selection of the shape and material of the inertia arm itself so that there is no need to attach an additional mass element to the intercoupling arm. When the vertical axis wind turbine 14 is operating according to the invention mechanic energy is stored by the mass element 5 since a centrifugal force and centrifugal acceleration, respectively, affects this mass element 5 by the rotation of the vertical axis wind turbine 14, which tries to accelerate the mass element 5 radially outwards (y-direction) with respect to the rotation axis 15.

The actuator component assembly 7 is connected with an actuator 8 (FIGS. 1 and 4), which may be actuated to extend the aerodynamic brake. The actuator component assembly 7 is capable of being actuated by the actuator 8 such that the aerodynamic brake may be moved and held in a retracted position and in any intermediate position between extended position and retracted position by a coupling device 11 which will be described in more detail below. Thus the intermediate positions represent a gradually adjustable aerodynamic partial braking action (between 0% and 100%, wherein 0% corresponds to a totally retracted position and 100% corresponds to a totally extended position) of the vertical axis wind turbine 14, while the totally extended aerodynamic brake represents the full aerodynamic braking action of the vertical axis wind turbine 14. In the embodiment, the actuator 8 comprises an adjusting motor (not shown), which is connected to at least one lever arm 20 by at least one connection element 18 such as a driving rod. In the embodiment this lever arm 20 is pivotally mounted on the torsion element as shown in FIG. 4.

In another embodiment of the present invention, the actuator component assembly 7 may also comprise a reset element (not shown) which causes the actuator 8 to extend the aerodynamic brake against a preload of the spring element if the actuator 8 may not be actuated or comprises a defect. This is in particular provided for a situation where no centrifugal force is available to extend the aerodynamic brake against the preload of the spring element, i.e. if the vertical axis wind turbine 14 is not in rotation. This reset element may be e.g. an additional spring element.

The mass component assembly and the actuator component assembly 7 may be provided with limiters 9 and 10, which restrict the freedom of movement of the individual components to a predetermined adjustment range. Depending on the embodiment one or more limiters 9 may be utilized at one or more components. The embodiment e.g. in FIGS. 1 and 2 comprises limiters 9 for the actuator component assembly 7 which define the maximal possible adjustments of the actuator component assembly and—by its fixed connection to the mass component assembly 4—also the maximal possible adjustments of the mass component assembly 4. Therefore, the actuator component assembly 7 comprises an arrester arm 21, as may be seen in FIG. 1. The arrester arm 21 drives against the limiters 9 at the predetermined positions of the limiters 9 and restricts the movement of the actuator component assembly. The actuator element 8 causes the arrester arm 21 resting against the corresponding limiter 9 in the retracted position. However, similar arrester arms 21 may be provided for each component of the present invention e.g. limiter 10. The sub-components itself may act as arrester arms 21 for limiters 9 and 10 so that an arrester arm 21, being an additional part, may be omitted.

In order to provide an effective connection between the mass component assembly 4 and the actuator component assembly 7 a coupling device 11 is provided according to the invention. In an embodiment (not shown) of the invention the coupling device 11 may be attached to the actuator component assembly 4 in order to optionally couple and uncouple the spring and mass component 4 from the actuator component assembly 7. The coupling device 11 may also be located at the actuator component assembly 7, or in particular at the lever arm 20 of the actuator 8 in order to optionally couple and uncouple the actuator component assembly 7 to the mass component assembly 4 in an effective manner. If the coupling device 11 is located at the mass component assembly, the actuator component assembly 7 may comprise a corresponding matching part to secure the coupling. In the contrary case the same applies. Thus the matching part is part of the coupling device 11.

In an preferred embodiment of the present invention the coupling device can also be an individual part as shown in FIG. 1*a*. The coupling device 11 of said alternative embodiment performs the same objective as the coupling device 11, which will be explained in more detail below. The choice whether to use a coupling device 11 or an individual coupling device 11 is based on the specific technical requirements of individual implementations and can be chosen by a person skilled in the art.

The coupling device 11 is able to disconnect and to reconnect the connection between the spring and mass component assembly 4 on the one hand, and the actuator component assembly 7 on the other hand.

As long as the coupling device 11 maintains the connection between the mass component assembly 4 on the one hand, and the actuator component assembly 7 on the other hand, the actuator component assembly 7 exerts an adjustable and controllable force on the mass component assembly 4 so that the mass element 5 is not able to actively overcome the preload force of the spring element, neither will it be reacting to the centrifugal force, caused by the rotation of the vertical axis wind turbine 14. The movement behaviour and the respective position of the aerodynamic brake is dominated and determined by the actuator 8. When the aerodynamic brake is in an intermediate position between an extended and retracted position, the position is maintained by the actuator component assembly 7 which is connected to the actuator 8, and the mass element 5 is not able to set the aerodynamic brake into the extended position by the centrifugal force which is present during the rotation of the vertical axis wind turbine 14. The actuator component assembly is designed such way that it is able to adjust and maintain any possible position of the aerodynamic brake in opposition to the effects of the spring (if existent) as well as the centrifugal force of the mass element 5, as long as the coupling device 11 maintains the coupling between the mass component assembly 4 on the one hand, and the actuator component assembly 7 on the other hand. In other words, it is ensured that the controlling of the aerodynamic brake is performed only by the actuator component assembly 7 as long as the coupling device 11 maintains the connection between the mass component assembly on the one side, and the actuator component assembly on the other side. The coupling device may be, but is not limited to, an electro-magnetic solenoid, with an attached plunger, which provides the coupling action When the coupling device 11 releases the connection between the mass component assembly 4 on the one hand, and the actuator component assembly the positioning effect of the actuator component assembly is abolished. In this uncoupled state the mass element 5 of the mass component assembly is not retained by the actuator component assembly 7 anymore. Thus, the centrifugal force, which exists during rotation of the vertical axis wind turbine 14, will move the mass element 5 radially outwards with respect to the rotation of the vertical axis wind turbine 14 (y-direction), i.e. substantially perpendicular to the longitudinal axis of the airfoil. Since this mass element 5 is able to overcome the effect of the spring element by centrifugal force, the aerodynamic brake in this situation is caused to move from the current position, i.e. from the retracted position or any intermediate position, to the completely extended position. Thereby, the aerodynamic brake is fully activated; the driving flow of the vertical axis wind turbine 14 is interrupted almost completely and the rotation of the vertical axis wind turbine 14 slows down to a halt.

The uncoupling of the actuator component assembly from the other components may be initiated by different measures. For example, a switch or a button (not shown) may be actuated at will, which causes the uncoupling. Likewise, it is possible to cause the uncoupling by commands of an electronic controller of a computer. In an embodiment of the invention this uncoupling is caused by a power interruption, which is effected when an error, a defect or an electrical malfunction (i.e. caused by lightning strike) of any of the components of the vertical axis wind turbine 14 occurs. Thus, an automatic emergency shut down of the rotation of the vertical axis wind turbine 14 is caused without the need for an active command by an operator or software. According to another embodiment of the invention it is also provided to cause the uncoupling by various measures. The coupling device 11 may be activated by manual switching as well as autonomously. In an embodiment of the invention the coupling device 11 comprises a magnetic coupling. In this case at least one electromagnet (solenoid) is permanently supplied with current for maintaining the coupling and connection, respectively, between the spring and mass component assembly and the actuator component assembly. As soon as the current is interrupted, the electro-magnetic field collapses and thus the connection uncouples. Through this action the actuator 8 looses its dominating influence on the position of the aerodynamic brake, i.e. actuator 8 and aerodynamic brake are uncoupled from each other. In result, the kinetic energy stored in the mass element 5 is released and thus the aerodynamic brake is extended.

Figure 3:
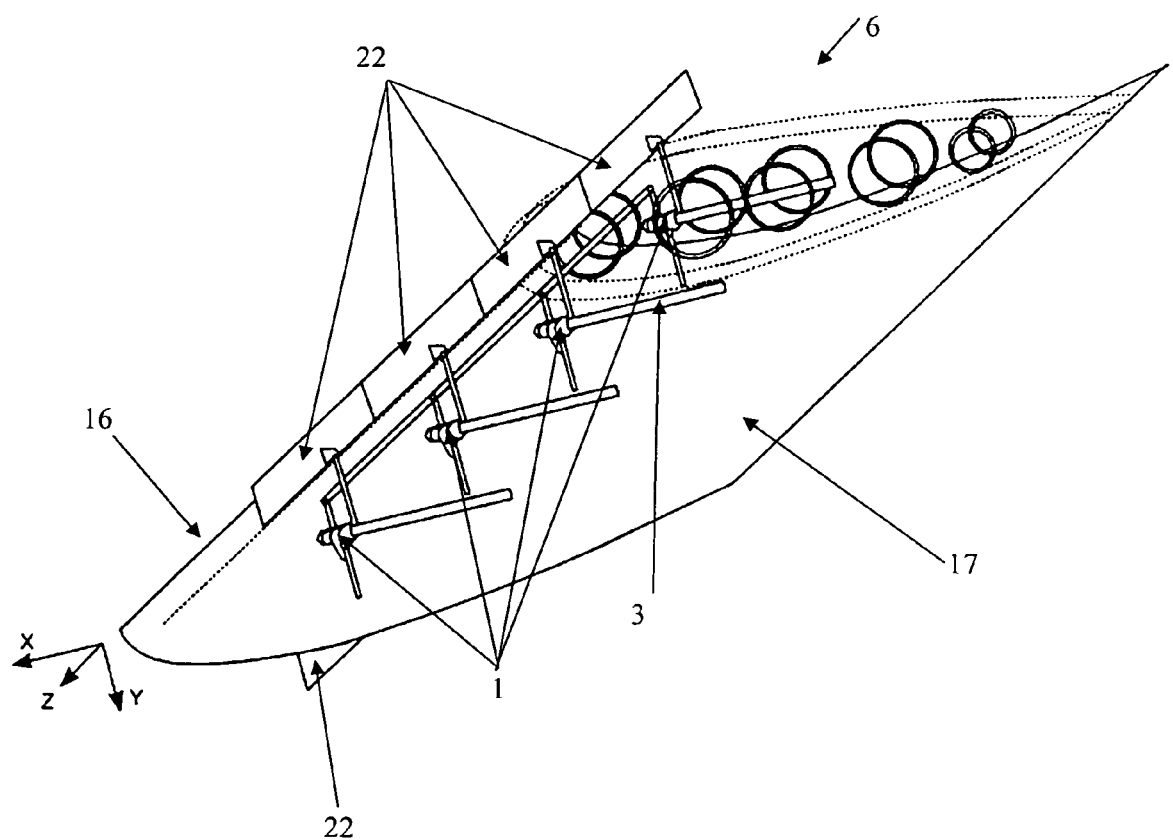
FIG. 3 shows an airfoil segment 6 having several coupled control devices 1 according to the present invention.

The aerodynamic brake according to the present invention comprises at least one retractable device or spoiler panel respectively, which is attached to an airfoil segment 6 of a vertical axis wind turbine 14 and which is connected to the control device 1 by at least one connection element 18 and/or at least one hinge device 23. This connection element 18 is a pipe or rod element. In one embodiment the retractable device is a spoiler panel 22, which can be positioned into the air flow with its surface, so that the air flow is substantially interrupted, causing a full braking operation. According to the invention, a spoiler panel 22 may be provided which is extended directly out of the airfoil segment's surface 6 under a defined angle. In this embodiment a hinge device 23 is not required. In case of a partial braking operation, which corresponds to a controlling and steering, respectively, of the torque developing of the vertical axis wind turbine 14, the air flow is selectively affected. The surface is positioned into the air flow so that the air flow impacts the surface as perpendicular as possible in order to achieve maximum drag and disrupting lift/torque production, when the vertical axis wind turbine 14 is to be subject to a full braking operation. In case of a partial braking operation, or partially limiting the amount of torque, the spoiler panel 22 is only partially extended. In an embodiment of the invention the retractable device comprises two spoiler panels 22 per control device 1. However, only one spoiler panel 22 or a multitude of spoiler panels 22 per control device are possible as well. This embodiment as shown in FIGS. 3 and 4 comprises an inner and an outer spoiler panel 22. All spoiler panels 22 of the aerodynamic brake are connected to their corresponding control devices 1 such that in the retracted position they are flush with the surface of the airfoil segment 6, i.e. are retracted, or substantially perpendicular relative to the driving air flow with their surfaces in the extended position. According to an embodiment of the invention the spoiler panels 22, which are opposing each other, are extended in opposite directions with respect to each other, since they are mounted on opposite sides of the airfoil in order to affect the driving flow on either side. It is also possible that the spoiler panels 22 are located in a cavity of the airfoil segment 6 when in a retracted position, and leaving the cavity at least partially during extension. In an embodiment several spoiler panels 22 are connected to each other by connected sub-components, e.g. the intercoupling arm 13, so that the movements of the spoiler panels 22 are equal and/or symmetrical. However, the spoiler panels 22 may be connected to each other by interconnected sub-components so that their movement is coupled asymmetrically, i.e. that the spoiler panels 22 are extended simultaneously or time-lagged in positions which differ from each other. A person skilled in the art is aware of mechanical lever transformation devices required therefore, and they are not described in here in more detail.

In the embodiment in FIG. 3 the aerodynamic brake and the spoiler panels 22, respectively, are moved symmetrically. However, according to the invention it is also possible that the spoiler panels 22 are moved asymmetrically with respect to each other. This may easily be adjusted depending on the need, by utilizing different lengths of the connection elements 18 or different gear transmission ratios, e.g. in this case in this embodiment connection elements 18 having different distances to the torsion element (here a torsion element 3) may be utilized at the mass component assembly.

According to the invention multiple control devices 1 may also be operated in a coupled manner, as may be seen in FIG. 3. These are connected to each other by connection elements 18 which are attached movable to the corresponding control device 1. In the embodiment the connection elements 18 are connected to the mass component assembly 4 at points C and D. Thereby the extension and retraction action of a spoiler panel 22 or a spoiler panel pair 22 of the aerodynamic brake may be transferred to additional spoiler panels 22.

An airfoil segment 6 may also comprise multiple control devices 1 according to the present invention. Moreover, an airfoil may be made of multiple airfoil segments 6 which comprise control devices 1 according to the present invention. Airfoils having control devices 1 according to the present invention are intended for vertical axis wind turbines 14, but they may also be used in other technical applications.

In summary, also a control method according to the invention for an aerodynamic braking operation of a wind energy system having a control device according to the present invention is disclosed. This braking method may be initiated by an operator, electronically e.g. by a computer or autonomously. The autonomous initiation is responsive to a defect or a malfunction in the wind energy system. The inventive method comprises at first an uncoupling of the spring and mass component assembly and the actuator component assembly. This is performed via a coupling device 11, e.g. an electro magnetic coupling. In an embodiment of the invention an electro magnetic coupling is permanently provided with electrical energy in order to maintain the coupling between the spring and mass component assembly and the actuator component assembly. In case of a defect or a malfunction in the wind energy system, in particular in the control device 1, the electrical supply is interrupted and the coupling of the spring and mass component assembly 4 and actuator component assembly 7 is abolished and assemblies 4 and 7 are uncoupled.

As a result of the uncoupling of the spring and mass component assembly 4 and actuator component assembly 7 the aerodynamic brake is extended substantially into a position up to perpendicular to the rotation direction of the airfoil segment 6 by moving the mass component assembly 4 by centrifugal force. In particular, the spoiler panels 22 are positioned into the wind so they are located as perpendicular as possible into the driving air flow of the wind. The flow characteristics of the airfoil segment 6 are changed so that the driving flow of the wind energy system becomes turbulent and lift-generation (torque) is interrupted. Due to the lapse of the driving flow the vertical axis wind turbine 14 is not able to collect wind energy any more. Additionally, the spoiler panels 22, which are located perpendicular to the wind, form a barrier for the wind flow so that any rotation of the vertical axis wind turbine 14 is retarded. This may result in a complete stop of the rotation, which leads to a shut down of the wind energy system. As a matter of course all embodiments of the present invention may be combined with each other.

Figure 5:
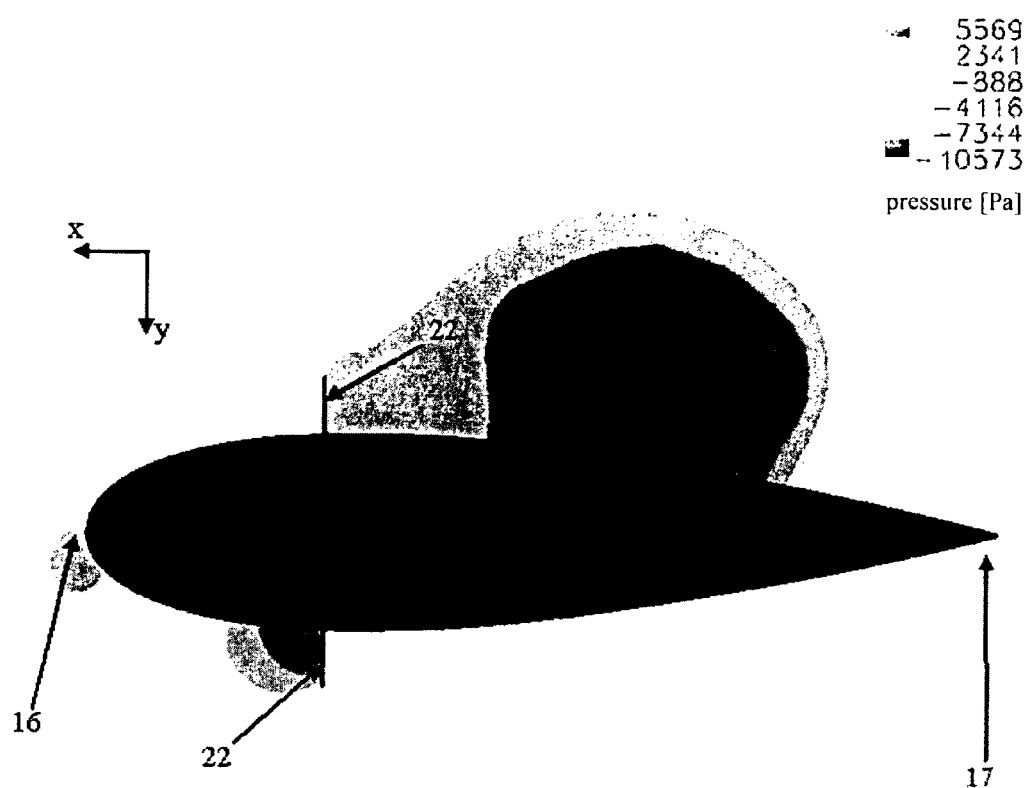
FIG. 5 shows the profile of an airfoil segment 6 and an air pressure spreading during braking action with the control device 1 according to an embodiment of the present invention.
Figure 6:
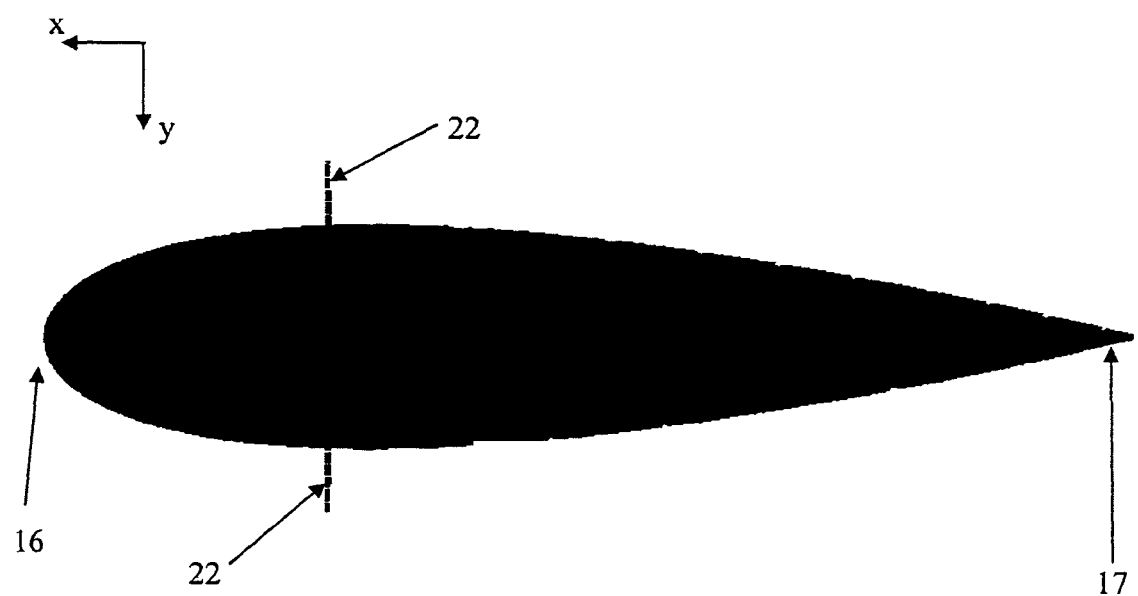
FIG. 6 shows a profile of an airfoil segment 6 and an air flow spreading during braking action with the control device 1 according to an embodiment of the present invention.

FIG. 5 and FIG. 6 show the braking effect of the aerodynamic brake according to an embodiment of the present invention. In both figures the profile of an airfoil segment 6 is shown. FIG. 5 shows an air pressure distribution and FIG. 6 shows an air flow distribution in a braking situation. It may be readily seen in FIG. 6 that the spoiler panels 22 form a barrier against the driving air flow from the direction of the leading edge 16 so that the driving flow is interrupted and in the area behind the spoiler panel 22 and towards the trailing edge 17, a flow reversion occurs. Thus, the airfoil segment 6 may not transform wind energy to rotational energy anymore. The air pressure distribution in FIG. 5 shows that a negative pressure builds up behind the spoiler panel 22 towards at the trailing edge 17. Compared to the normal ambient pressure taken as zero-level, whose force effect acts against the direction of movement of the airfoil segment 6. However, in front of the spoiler panel 22 and at the leading edge 16 an overpressure, compared to the ambient pressure taken as zero-level, builds up. The over pressure now acts against the direction of movement of the airfoil segment 6 as well and the rotation of the rotor segment 6 is retarded. As a matter of course all embodiments of the present invention may be combined with each other.

Figure 7:
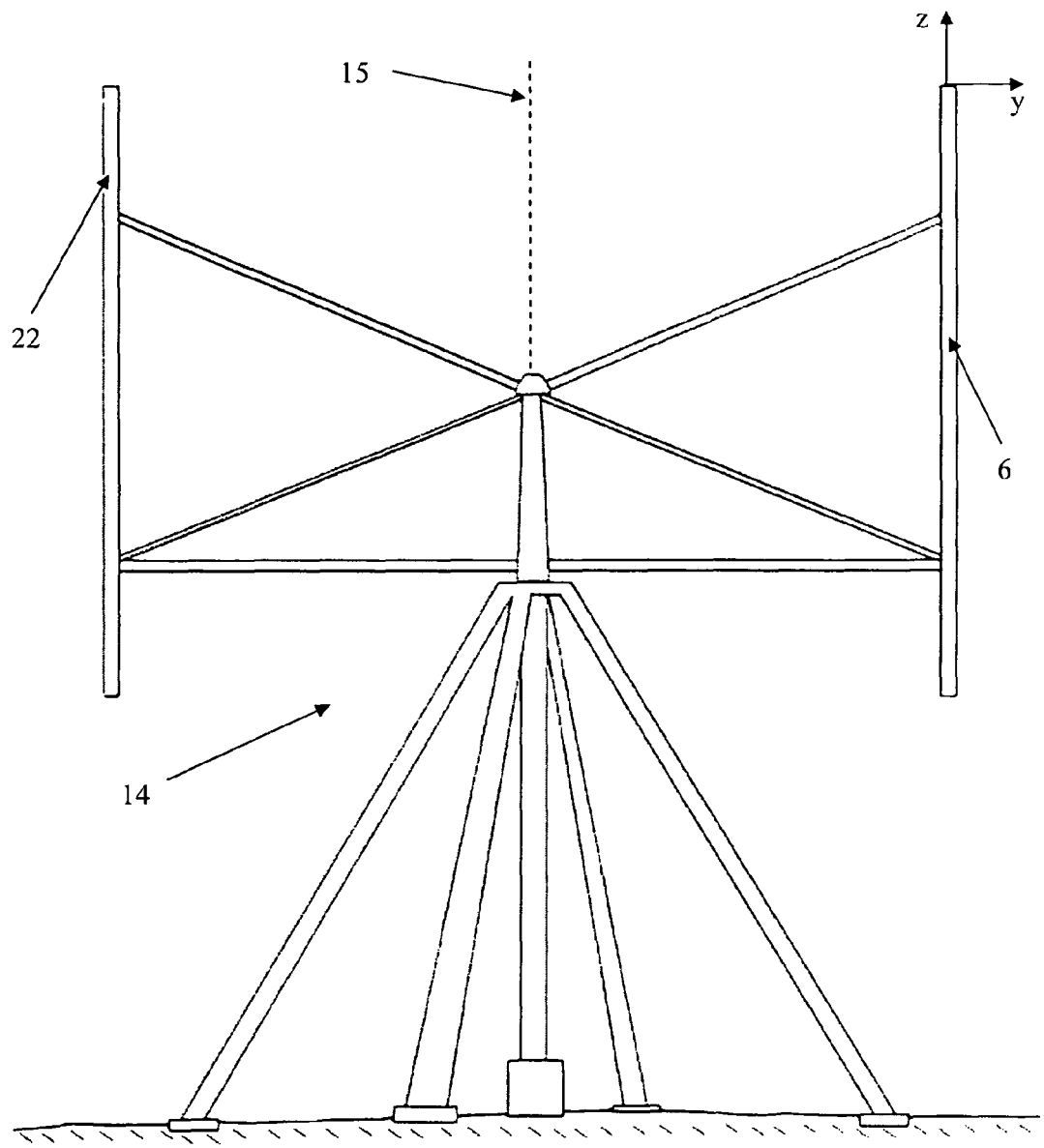
FIG. 7 shows a wind force system and a wind energy plant, respectively, of the type of a vertical axis wind turbine 14 (VAWT).

A wind energy system according to the present invention comprises at least one rotor and vertical airfoil runner having at least an airfoil segment 6 which comprises a control device 1 according to the invention for an aerodynamic brake, and at least one energy dissipation device. The energy dissipation device may be e.g. an electric generator that dissipates mechanical energy provided by the rotation of a rotor and vertical airfoil runner, respectively, comprising at least one airfoil segment 6, into electric energy. However, this energy dissipation device may also be a different apparatus, e.g. a pump, a crushing mill or the like. FIG. 7 shows a wind energy plant and wind energy system, respectively, of the vertical axis wind turbine type 14 (VAWT), which is provided with a control device 1 according to the present invention.

Figure 8:
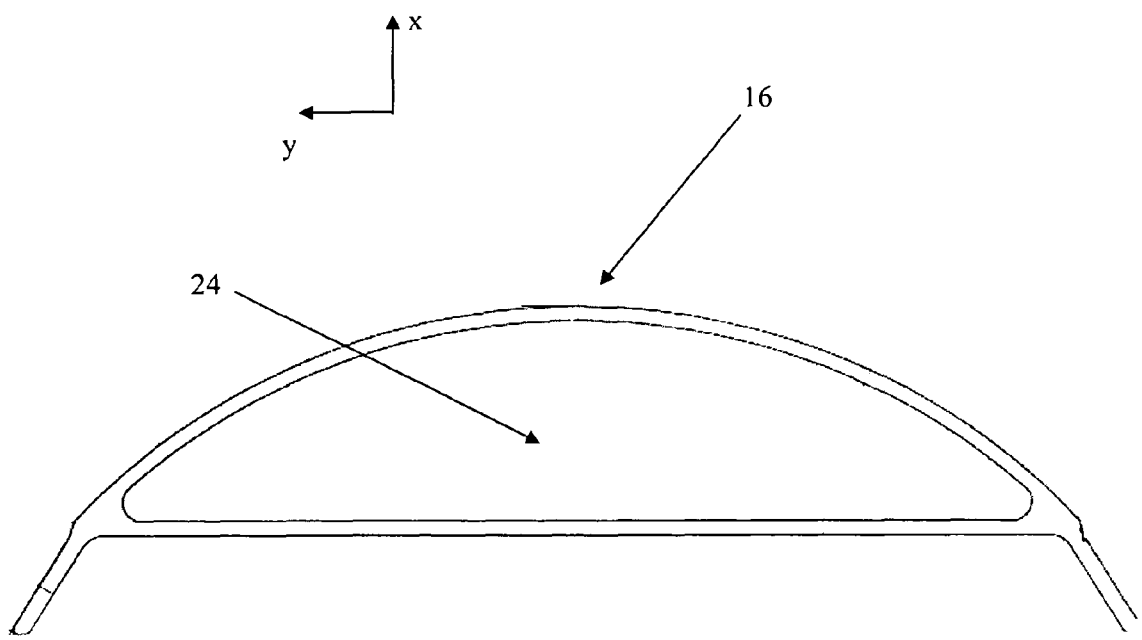
FIG. 8 shows a cross section in the area of the leading edge 16 of the airfoil segment.

Furthermore, a heating device is provided in the wind energy system according to the invention. This heating device (FIG. 8), which is the structural part forming the leading edge, transmits a part of the waste energy provided by the electrical and/or mechanical energy transformation devices into the inside of at least one airfoil segment's 6 leading edge in order to heat at least one airfoil segment' leading edge 6. Waste thermal energy is taken from the energy dissipation device and directly guided into the inside of at least one airfoil segment's leading edge. According to one embodiment, the thermal energy is only guided along the inside of the leading edge 16 (FIG. 8), i.e. in the inner frontal area 24 of the airfoil segment 6 since it is known that ice formation occurs most severely at the leading edge 16. If the energy dissipation device is an electric generator, also electric energy of the electric generator may be utilized to heat the inside of at least one airfoil segment 6, if a electric heating device is operated with that in the inside of the airfoil segment 6. As a matter of course all applicable kinds of energy may be utilized to heat the leading edge of an airfoil segment 6 and they may be combined with each other in order to achieve an optimal heating of the leading edge of an airfoil segment in case of a specific implementation.

A control device according to the above description is provided, wherein the inertia arm is rigidly connected to the torsion element 3 between the first and the second end of the inertia arm perpendicular to the rotation axis.

A control device according to the above description is provided, wherein the intercoupling arm is rigidly connected to the torsion element 3 between the first and the second end of the intercoupling arm perpendicular to the rotation axis and perpendicular to the inertia arm.

All above described embodiments, versions and partial aspects of the present invention may be combined with each other. Also multiple control devices 1 according to the present invention may be utilized in vertical axis wind turbines 14, which may be operated individually or coupled to each other. The control devices 1 according to the present invention may also be operated independently from each other within one vertical axis wind turbine 14.

Although embodiments of the present invention are exemplarily described they are not intended to be interpreted in a way to limit the scope of the appending claims thereto. Persons skilled in the art know that different modifications and variations may be made to the described embodiments and that many other configurations or combinations of each of the embodiments is able to achieve an identical result without leaving the scope of the present claims. In fact, the present invention will suggest solutions for other tasks and adoptions for other applications. The applicant intends to cover all such applications of the present invention and changes and modifications by the appending claims which could be carried out to the embodiments for the purpose of the disclosure, without deviating from the spirit and the scope of the present invention.

Many modifications and variations of the present invention are possible in light of the above descriptions. It is therefore to be understood that, within the scope of the claims, the invention may be implemented otherwise than as specifically described.

LIST OF REFERENCE SIGNS 1 control device
3 torsion element
4 mass component assembly
5 mass element
6 airfoil segment
7 actuator component assembly
8 actuator
9 limiters
10 limiter
11 coupling device
12 inertia arm
13 intercoupling arm.
14 vertical axis wind turbine
15 rotation axis
16 leading edge
17 trailing edge
18 connection element
19 rotation axis of the torsion element
20 lever arm
21 arrester arm
22 spoiler panel
23 hinge device
A connection point for a connection element 18 between 4 and 22
B connection point for a connection element 18 between 4 and 22
C connection point for a connection element 18 between adjacent control devices 1
D connection point for a connection element 18 between adjacent control devices 1
E connection point for an actuator 8

The invention claimed is:

1. A vertical axis wind turbine with a vertical axis of rotation, the turbine comprising:
at least one rotor blade segment, which comprises at least retractable and extendable flow plates, wherein the rotor blade segment is supported such that the rotor blade segment is rotatable about the vertical axis of rotation; and
at least one control device to control the flow plates, the control device comprising:
a first component comprising at least one spring element;
a second component comprising at least one mass element, the mass element is provided on a first sub-component, wherein the first sub-component is supported such that the first sub-component is rotatable about an axis of rotation; and
a third component comprising an actuator, wherein the third component is detachably connected with the second component,
wherein at least two connection points are arranged on the first sub-component such that the connection points are essentially opposed to one another with reference to the axis of rotation, in each connection point one connecting element engages, which in each case connects the control device with one flow plate of the vertical axis wind turbine,
wherein the control device controls the flow plates in opposite senses to one another via the connecting elements with a pivotal movement of the first sub-component conditioned by action of a centrifugal force on the mass element.

2. The vertical axis wind turbine according to claim 1, wherein the first component is connected with the second component in a force transmitting manner.

3. The vertical axis wind turbine according to claim 1, wherein the second component is limited to a previously defined range of adjustment of movement by means of a limiter.

4. The vertical axis wind turbine according to claim 1, wherein the second component comprises a coupling device attached to the mass element, wherein the coupling device couples or decouples the second and third components as required.

5. The vertical axis wind turbine according to claim 4, wherein, by coupling the second and third components, the coupling device prevents an extension outward of an aerodynamic brake as conditioned by centrifugal force.

6. The vertical axis wind turbine according to claim 4, wherein, by decoupling the second and third components, the coupling device enables an extension outward of an aerodynamic brake as conditioned by centrifugal force.

7. The vertical axis wind turbine according to claim 4, wherein the third component provides movement of the first and second components, as long as the coupling device is coupling the third component with the second component.

8. The vertical axis wind turbine according to claim 4, wherein the coupling device is equipped to decouple the second and third components if the third component, at least partially failed, drops out.

9. The vertical axis wind turbine according to claim 1, wherein the third component comprises a coupling device attached to the actuator, wherein the coupling device couples or uncouples the second and third components as required.

10. The vertical axis wind turbine according to claim 9, wherein, by coupling the second and third components, the coupling device prevents an extension outward of an aerodynamic brake as conditioned by centrifugal force.

11. The vertical axis wind turbine according to claim 9, wherein, by decoupling the second and third components, the coupling device enables an extension outward of an aerodynamic brake as conditioned by centrifugal force.

12. The vertical axis wind turbine according to claim 9, wherein the third component provides movement of the first and second components, as long as the coupling device is coupling the third component with the second component.

13. The vertical axis wind turbine according to claim 9, wherein the coupling device is equipped to decouple the second and third components if the third component, at least partially failed, drops out.

14. The vertical axis wind turbine according to claim 1, wherein the actuator of the third component comprises a servomotor.

15. The vertical axis wind turbine according to claim 1, wherein the spring element is a torsion element.

16. The vertical axis wind turbine according to claim 1, wherein the first sub-component is securely connected with the spring element, at right angles to the axis of rotation, between first and second ends of the first sub-component.

17. The vertical axis wind turbine according to claim 1, wherein the second component comprises a second sub-component, which is securely connected with the spring element, at right angles to the axis of rotation and at right angles to the first sub-component, between first and second ends of the second sub-component.

18. The vertical axis wind turbine according to claim 1, wherein the spring element runs from a leading edge of the rotor blade segment to a profile end of the rotor blade segment.

19. The vertical axis wind turbine according to claim 1, wherein the flow plates are positioned on an outer surface of the rotor blade segment such that the plane of the flow plates is extendable outward from a position parallel to the direction of rotation of the rotor blade segment to a position at right angles to the direction of rotation of the rotor blade segment as required, such that the flow plates are located at right angles to incident flow.

20. The vertical axis wind turbine according to claim 1, wherein the second component with the mass element is positioned such that, in the event of rotation of the rotor, the mass element is moved radially outward by the centrifugal force.

21. The vertical axis wind turbine according to claim 1, wherein the third component comprises a restoring element, which causes the actuator to extend an aerodynamic brake outward against pre-tension of the spring element if the actuator is not activated.

22. The vertical axis wind turbine according to claim 1, comprising a plurality of control devices, wherein the control devices are coupled via at least one connecting device, to transfer rotational movements of the second components between one another.

23. The vertical axis wind turbine according to claim 1, further comprising:
   at least one energy converter device.

24. The vertical axis wind turbine according to claim 1, further comprising:
   a heating device, which is equipped to conduct energy from an energy converter device into the interior of the rotor blade segment to heat the rotor blade segment internally.

25. The vertical axis wind turbine according to claim 24, wherein the heating energy is selected from the group consisting of waste heating energy of the energy transducer device of the wind energy system, electrical heating energy, and a combination thereof.

26. A method for an aerodynamic braking of the vertical axis wind turbine according to claim 1, the method comprising:
   decoupling the second component from the third component;
   outward extension of the flow plates, essentially into a position up to one at right angles to the direction of rotation of the rotor blade segment, by movement of the second component by centrifugal force; and
   modifying flow properties of the rotor blade segment, so as to interrupt, at least partially, incident flow of the vertical axis wind turbine, which causes breaking of the wind turbine.

27. The method according to claim 26, wherein the decoupling is triggered by a failure of the third component.

28. The method according to claim 26, wherein the decoupling is triggered by an interruption of an electrical current in the coupling device.

29. The method according to claim 26, wherein partial braking or full braking of the vertical axis wind turbine is performed.

* * * * *